United States Patent
Ilic et al.

(10) Patent No.: US 9,099,938 B2
(45) Date of Patent: Aug. 4, 2015

(54) BI-DIRECTIONAL ENERGY CONVERTER WITH MULTIPLE DC SOURCES

(75) Inventors: Milan Ilic, Cupertino, CA (US); Mika Nuotio, San Jose, CA (US); Jon Bonanno, San Francisco, CA (US)

(73) Assignee: EMPOWER MICRO SYSTEMS, San Francisco, CA (US)

( * ) Notice: Subject to any disclaimer, the term of this patent is extended or adjusted under 35 U.S.C. 154(b) by 683 days.

(21) Appl. No.: 13/441,788

(22) Filed: Apr. 6, 2012

(65) Prior Publication Data
US 2013/0155736 A1 Jun. 20, 2013

Related U.S. Application Data

(60) Provisional application No. 61/576,363, filed on Dec. 16, 2011.

(51) Int. Cl.
| | | |
|---|---|---|
| *H02M 7/5387* | (2007.01) | |
| *H02M 7/72* | (2006.01) | |
| *H02M 1/00* | (2007.01) | |
| *H02J 3/32* | (2006.01) | |

(Continued)

(52) U.S. Cl.
CPC .. *H02M 7/72* (2013.01); *H02J 3/32* (2013.01); *H02J 3/381* (2013.01); *H02J 9/06* (2013.01); *H02M 7/5387* (2013.01); *H02M 2001/0077* (2013.01)

(58) Field of Classification Search
CPC ................... H02M 2001/0077; G05F 1/67
USPC ................. 361/18; 363/132, 71, 89; 700/297; 307/46, 48, 66, 82; 323/908
See application file for complete search history.

(56) References Cited

U.S. PATENT DOCUMENTS

| 4,719,550 | A | * | 1/1988 | Powell et al. .................. 363/37 |
| 5,642,275 | A | | 6/1997 | Peng et al. |

(Continued)

FOREIGN PATENT DOCUMENTS

| DK | WO2010037393 A1 | 4/2010 |
| JP | 2009290919 A | 10/2009 |

(Continued)

OTHER PUBLICATIONS

Johnson et al, Photovoltaic AC Module Composed of a Very Large Number of Interleaved Inverters, IEEE 2011.

(Continued)

*Primary Examiner* — Rexford Barnie
*Assistant Examiner* — Elim Ortiz
(74) *Attorney, Agent, or Firm* — Tran & Associates

(57) ABSTRACT

A multiple dc sources bi-directional energy converter includes a plurality of direct current (DC) power sources; one alternating current (AC) power source; at least one stacked alternating current (AC) phase, each stacked alternating current (AC) phase having at least two or more full bridge converters, each respectively coupled to one of the direct current power sources, each full bridge converter having an inductor electrically coupled thereto; and a local controller coupled to each full bridge converter controlling the firing sequence of the switching devices in said full bridge converter to generate an approximately nearly sinusoidal voltage waveform when operated as a voltage source inverter in one direction or generate an approximately nearly constant direct current (DC) output when operated as a full-wave active rectifier in the opposite direction.

21 Claims, 13 Drawing Sheets

(51) Int. Cl.
*H02J 3/38* (2006.01)
*H02J 9/06* (2006.01)

(56) References Cited

U.S. PATENT DOCUMENTS

| | | | |
|---|---|---|---|
| 6,542,344 B1* | 4/2003 | Mashiko | 361/93.9 |
| 7,643,319 B2 | 1/2010 | Wagoner | |
| 7,796,412 B2 | 9/2010 | Fornage | |
| 7,962,249 B1* | 6/2011 | Zhang et al. | 700/295 |
| 8,089,178 B2 | 1/2012 | Spanoche et al. | |
| 8,089,785 B2 | 1/2012 | Rodriguez | |
| 2004/0178766 A1* | 9/2004 | Bucur et al. | 320/112 |
| 2005/0127853 A1 | 6/2005 | Su | |
| 2005/0139259 A1 | 6/2005 | Steigerwald et al. | |
| 2009/0284998 A1 | 11/2009 | Zhang et al. | |
| 2011/0012429 A1 | 1/2011 | Fornage | |
| 2012/0091817 A1* | 4/2012 | Seymour et al. | 307/82 |
| 2012/0126623 A1* | 5/2012 | Koehl | 307/76 |
| 2014/0169053 A1* | 6/2014 | Ilic et al. | 363/132 |

FOREIGN PATENT DOCUMENTS

| | | |
|---|---|---|
| KR | 1020120130165 A | 11/2012 |
| WO | WO2011085259 A3 | 7/2011 |

OTHER PUBLICATIONS

Beig et al, A Novel Fifteen Level Inverter for Photovoltaic Power Supply System, IAS 2004.
Sanchis et al, Cascaded H-Bridge Multilevel Converter for Grid Connected Photovoltaic Generators with Independent Maximum Power Point Tracking of each Solar Array, IEEE 2003.
Rivera et al, Cascaded H-Bridge Multilevel Converter Multistring Topology for Large Scale Photovoltaic Systems, IEEE 2011.
Peng et al, A Multilevel Voltage-Source Inverter with Separate DC Sources for Static Var Generation, IEEE 1995.
Author: Chapman et. al, Title: "Photovoltaic AC Module Composed of a Very Large Number of Interleaved Inverters", Symposium: "Applied Power Electronics Conference and Exposition (APEC), 2011 Twenty-Sixth Annual IEEE", Date: Mar. 6-11, 2011, pp. 976-981, Print ISBN: 978-1-4244-8084-5, Publisher: IEEE, Location: Forth Worth, TX.
Author: Abdul Rahiman Beig et. al., Title: "A novel fifteen level inverter for photovoltaic power supply system", Symposium: "Industry Applications Conference, 2004. 39th IAS Annual Meeting. Conference Record of the 2004 IEEE (vol. 2 )", Date: Oct. 3-7, 2004, pp. 1165-1171 vol. 2, Print ISBN: 0-7803-8486-5, Publisher: IEEE, Location: Seattle, WA.
Author: O. Alonso et. al., Title: "Cascaded H-Bridge Multilevel Converter for Grid Connected Photovoltaic Generators with Independent Maximum Power Point Tracking of each Solar Array", Symposium: "Power Electronics Specialist Conference, 2003. PESC '03. 2003 IEEE 34th Annual (vol. 2 )", Date: Jun. 15-19, 2003, pp. 731-735 vol. 2, Print ISBN: 0-7803-7754-0, Publisher: IEEE, Location: Acapulco, Mexico.
Author: S. Rivera, Title: "Cascaded H-Bridge Multilevel Converter Multistring Topology for Large Scale Photovoltaic Systems", Symposium: "Industrial Electronics (ISIE), 2011 IEEE International Symposium on", Date: Jun. 27-30, 2011, pp. 1837-1844, Print ISBN: 978-1-4244-9310-4, Publisher: IEEE, Location: Gdansk, Poland.
Author: Fang Zheng Peng et. al., Title: "A Multilevel Voltage-Source Inverter with Separate DC Sources for Static Var Generation", Symposium: Industry Applications, IEEE Transactions on (vol. 32 , Issue: 5 ), Date: Oct. 8-12, 1995, pp. 2541-2548 vol. 3, Print ISBN: 0-7803-3008-0, Location: Orlando, FL.

* cited by examiner

BI-DIRECTIONAL ENERGY CONVERTER WITH MULTIPLE DC SOURCES

This application claims priority to Provisional Application Ser. No. 61/576,363, filed Dec. 16, 2011, the content of which is incorporated by reference.

The present invention relates to a bi-directional stacked voltage source converter with separate DC sources and at least one AC source, and more particularly to a bi-directional stacked voltage source inverter with separate DC sources and a AC source including an exemplary apparatus and a method for use in systems with DC storage elements, which can operate in off grid and on grid operation. The fields of use for this unique technology are, but not limited to, renewable electricity generation with storage, electric vehicles, energy storage, UPS in data center power management and motor drives.

U.S. Pat. No. 7,796,412 discloses an apparatus for power conversion. The apparatus has at least two power stages, each power stage of the at least two power stages capable of converting DC input power to DC output power; and a controller for dynamically selecting, based on a first DC power, one or more power stages of the at least two power stages for converting the first DC power to a second DC power, further comprising an output circuit coupled to the at least two power stages for converting the second DC power to AC power.

U.S. Pat. No. 8,089,178 discloses a direct current to pulse amplitude modulated ("PAM") current converter, denominated a "PAMCC", which is connected to an individual source of direct current. The PAMCC receives direct current and provides pulse amplitude modulated current at its three output terminals, wherein the current of each terminal is one hundred twenty degrees out of phase with the other two terminals. The pulses are produced at a high frequency relative to the signal modulated on a sequence of pulses. The signal modulated onto a sequence of pulses may represent portions of a lower frequency sine wave or other lower frequency waveform, including DC. When each phased output is connected in parallel with the outputs of similar PAMCCs an array of PAMCCs is formed, wherein each voltage phased output pulse is out of phase with respect to a corresponding current output pulse of the other PAMCCs. An array of PAMCCs forms a distributed three-phase multiphase inverter whose combined output is the demodulated sum of the current pulse amplitude modulated by each PAMCC on each phase.

In both approaches high voltage switching components have to be used for parallel grid application. The main drawbacks with those approaches are the high cost of semiconductor components, due to high voltage design, and relatively low operating frequency due to high switching losses. In addition, large and expensive low pass filtering components are required due to low switching frequency. Thus, a need for an inverter that can operate with high switching frequency and high efficiency for applications in AC power systems is clearly needed.

SUMMARY OF THE INVENTION

In one aspect, a method and apparatus for power conversion is disclosed. The system supports a plurality of operation options, including, but not limited to, grid storage applications, uninterruptible power supply applications, and electric vehicle power applications. To serve these applications, a multiple dc sources bi-directional energy converter includes a plurality of direct current (DC) power sources; one alternating current (AC) power source; at least one stacked alternating current (AC) phase, each stacked alternating current (AC) phase having at least two or more full bridge converters, each respectively coupled to one of the direct current power sources, each full bridge converter having an inductor electrically coupled thereto; and a local controller coupled to each full bridge converter controlling the firing sequence of the switching devices in said full bridge converter to generate an approximate sinusoidal voltage waveform when operated as a voltage source inverter in one direction or generate an approximate constant direct current (DC) output when operated as a full-wave active rectifier in the opposite direction.

In another aspect, a multiple dc sources bi-directional energy converter includes a plurality of direct current (DC) power sources; one alternating current (AC) power source; at least two or more full bridge converters, each respectively coupled to one of the direct current power sources and each having a primary node and a secondary node, each full bridge converter having a positive and negative node, each full bridge converter having a voltage supporting device electrically connected in a parallel relationship between said positive node and said negative node, each full bridge converter having an inductor electrically connected between primary and said first leg of full bridge converter, and a direct current (DC) power source connected between said positive and negative nodes; at least one stacked alternating current (AC) phase, each stacked alternating current (AC) phase having a plurality of said full bridge converters, each of said full bridge converters in each stacked alternating current (AC) phase interconnected in a series relationship with said secondary node of one of said full bridge converters connected to said primary node of another full bridge converter, said series interconnection defining a first full bridge converter and a last full bridge converter, each alternating current (AC) phase having an input node at said primary node of said first full bridge converter and an output node at said secondary node of said last full bridge converter; an alternative current (AC) power source connected across said alternating current (AC) phase; a local controller coupled to each full bridge converter controlling the firing sequence of the switching devices in said full bridge converter to generate an approximate sinusoidal voltage waveform when operated as a voltage source inverter in one direction or generate an approximate constant direct current (DC) output when operated as a full-wave active rectifier in the opposite direction; and a system controller communicating to each local controller, the system controller generating a system control signal for configuration, activation, deactivation and operating mode selection of said local controller.

In yet another aspect, a direct current (DC) voltage source inverter to supply power to an alternating current (AC) power system includes a plurality of full bridge inverters, each having a primary node and a secondary node, each of said full bridge inverters having a positive and a negative node, each of said full bridge inverters having a voltage supporting device electrically connected in a parallel relationship between said positive node and said negative node and a direct current (DC) source connected between the positive and negative nodes; at least one stacked inverter phase, each stacked inverter phase having a plurality of said full bridge inverters, each of said full bridge inverters in each stacked inverter phase interconnected in a series relationship with said secondary node of one of said full bridge inverters connected to said primary node of another full bridge inverter, said series interconnection defining a first full bridge inverter and a last full bridge inverter, each phase having an input node at said primary node of said first full bridge inverter and an output node at said secondary node of said last full bridge inverter; a local controller coupled to each full bridge inverter generating control signals to the full bridge inverter to output an approximate sinusoidal voltage waveform; the combination of said full bridge inverter and said local controller forming a basic inversion unit (BIU); a system controller communicating with the local controller of each basic inversion unit, the system controller generating a system control signal for configuration, activation, deactivation and operating mode selection of said basic inversion unit. The system includes generating a first error signal from comparison of an average DC voltage from a plurality of DC sources with a reference DC voltage; generating a second error signal from an average DC current with said detected and averaged AC current level; activating and deactivating a plurality of full bridge inverters based on the first and second error signals to approximate the sinusoidal voltage waveform. Implementations of this aspect can include one or more of the following. The method can include detecting the DC voltage and current levels of a plurality of DC sources and calculating power. The method includes averaging said DC voltage and current levels and comparing said average with a reference DC voltage and current. The method includes comparing said average with said detected and averaged AC current levels. The method includes generating a phase modulation signal from said second error signal and an AC line voltage detected period. An AC line voltage period can be detected using a phase locked loop. The method includes generating a plurality of firing reference signals for said full bridge inverters using said phase modulation signal. The method includes determining a modulation index and providing a reference table for said modulation index. In another aspect switching devices firing signals can be calculated based on phase modulation signal using a digital signal processor (DSP). The method includes providing communication between the basic inversion units and a system controller. The system controller controls a basic inversion unit operating range and also decides on needs of activating or deactivating of each basic inversion unit. The method includes interconnecting a plurality of full bridge inverters using a single conductor in series In one embodiment the system controller controls a single basic inversion unit operating as a current source and plurality of basic inversion units operating as voltage sources.

In another embodiment the system controller controls plurality of basic inversion units operating as voltage sources.

In other implementations of the above system can include one or more of the following. Three stacked inverter phases can be used and connected to form a wye (Y) or a delta (Δ) connection. Each basic inversion unit incorporates a switch to selectively shorten its output in the event of individual stage faults, allowing the remaining series connected basic inversion units to continue to operate. The full bridge inverter can be a first switching pair and a second switching pair, each of said switching pairs having a plurality of switching means for controllably regulating electrical current flow, each of said switching means having a first end and a second end, said first switching pair having a plurality of switching means electrically connected at said first end at said positive node of said full bridge inverter, said second end of one of said switching means of said first switching pair electrically connected to said primary node, said second end of another of said switching means of said first switching pair electrically connected to said secondary node, said second switching pair having a plurality of switching means electrically connected at said second ends at said negative node of said full bridge inverter, said first end of one of said switching means of said second switching pair electrically connected to said primary node, said first end of another of said switching means of said second switching pair electrically connected to said secondary node. The primary node can be connected to an inductor. The secondary node can be connected to an inductor. A capacitor can be connected between the primary and secondary nodes to generate a local AC voltage reference used for synchronization of the basic inversion units to the AC grid phase. Each basic inversion unit detects the line frequency when the capacitor is present. The capacitors also provide short term protection against reverse current flow in the event to individual device failures. The switching device can be a gate turn-off device and an anti-parallel device connected in parallel and oppositely biased with respect to one another. The gate turn-off device comprises a component selected from the group consisting of: a gate turn-off thyristor, an insulated gate bipolar transistor (IGBT), a metal-oxide-semiconductor field-effect transistor (MOSFET), a metal semiconductor field effect transistor (MESFET), a junction gate field-effect transistor (JFET), a MOSFET controlled thyristor, a bipolar junction transistor (BJT), a static induction transistor, a static induction thyristor and a MOSFET turn-off thyristor, a gallium nitride (GaN) transistor, a silicon carbon (SiC) transistor. The antiparallel device can be a diode. Each full bridge inverter can be connected to capacitors, batteries, fuel cells, photovoltaic cells, photovoltaic modules or biomass cells. A buck or boost voltage regulation circuit can be placed between the DC power source and the full bridge inverter within the basic inversion unit. An active filter can decouple AC voltage modulation imposed on the DC voltage within each basic inversion unit when used with DC sources including photovoltaic cells. A variable number of basic inversion units can be used in a phase to match a specific grid voltage. Each basic inversion unit can operate at different DC power levels. A variable number of basic inversion units can be used for each phase.

In yet another aspect, a method for inverting a plurality of direct current (DC) sources to approximate a sinusoidal voltage waveform includes detecting grid AC voltage level where a stacked phase will be connected to an AC grid network; calculating AC start up voltage for stacked basic inversion units by a system controller; calculating power, implementing maximum power point tracking algorithm, and generate a reference DC voltage; averaging said input DC voltage levels; comparing said average DC voltage levels with a reference DC voltage; generating a first error signal from said comparison of said average with a reference DC voltage; comparing an average DC current from the DC voltage sources with detected AC current levels; generating a second error signal from said comparison of said average with said detected AC current levels; generating a phase modulation signal from said second error signal; detecting an AC line voltage having a period; generating a phase reference signal directly related to said period of said AC line voltage; generating a plurality of firing reference signals for a full bridge inverter using said phase reference signal; determining a modulation index; and providing a reference table for said modulation index. In one implementation, the output shorting means, e.g. relay, solid state switch, or other, is an optional configuration. Each basic inversion unit can have the shorting means to prevent the possibility where the system could not operate if one of the series connected units fails or does not have enough DC input power to operate. The control of the shorting means could come from either a) the local controller, or b) from the system controller. The system controller can close at least one parallel switch with a current limiting device that will serve as a phase reference signal said AC line voltage for synchronization of each basic inversion unit prior to the start of power generation by the stacked basic inversion units.

In another aspect, a method for inverting a plurality of DC sources to approximate a sinusoidal voltage waveform includes sensing an average DC voltage from a plurality of DC sources; activating and deactivating a plurality of full bridge inverters based on the sensed DC voltage. Implementations can include one or more of the following. The method includes providing communication means between the basic inversion units and a system controller. The method includes detecting the AC voltage level and creating first voltage reference signal if voltage is outside a range calculated by the system controller. The method includes detecting the AC voltage levels and creating first current reference signal if voltage is inside the range calculated by the system controller. The method includes averaging said AC voltage levels and comparing said average with a reference DC voltage. The method includes averaging said AC current levels and comparing said average with a reference DC current. The method includes generating a phase shift signal from said user command signal. The method includes detecting an AC line voltage having a period and generating a phase reference signal directly related to said period of said AC line voltage. The method includes generating a plurality of firing signals for a plurality of full bridge inverters using said phase reference signal and said phase shift signal. The method includes determining a modulation index and providing a reference table for said modulation index. The method includes determining firing signals by comparing phase reference signal to up-down digital counters.

Advantages of the preferred embodiments may include one or more of the following. The system provides a new and improved stacked voltage source inverter and more specifically a stacked voltage source inverter for connecting to a high voltage, high power AC system. The system provides a wye or delta configured stacked voltage source inverter interface to the grid. The system requires only 2 cables for each inverter. The system is highly efficient, yet scalable. The system can be configured for single or three phase operation. The system is highly reliable, small form factor, and very light weight. The system is flexible, supporting multiple grid voltages and frequencies with a single basic inversion unit device configuration.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DESCRIPTION

Figure 2:
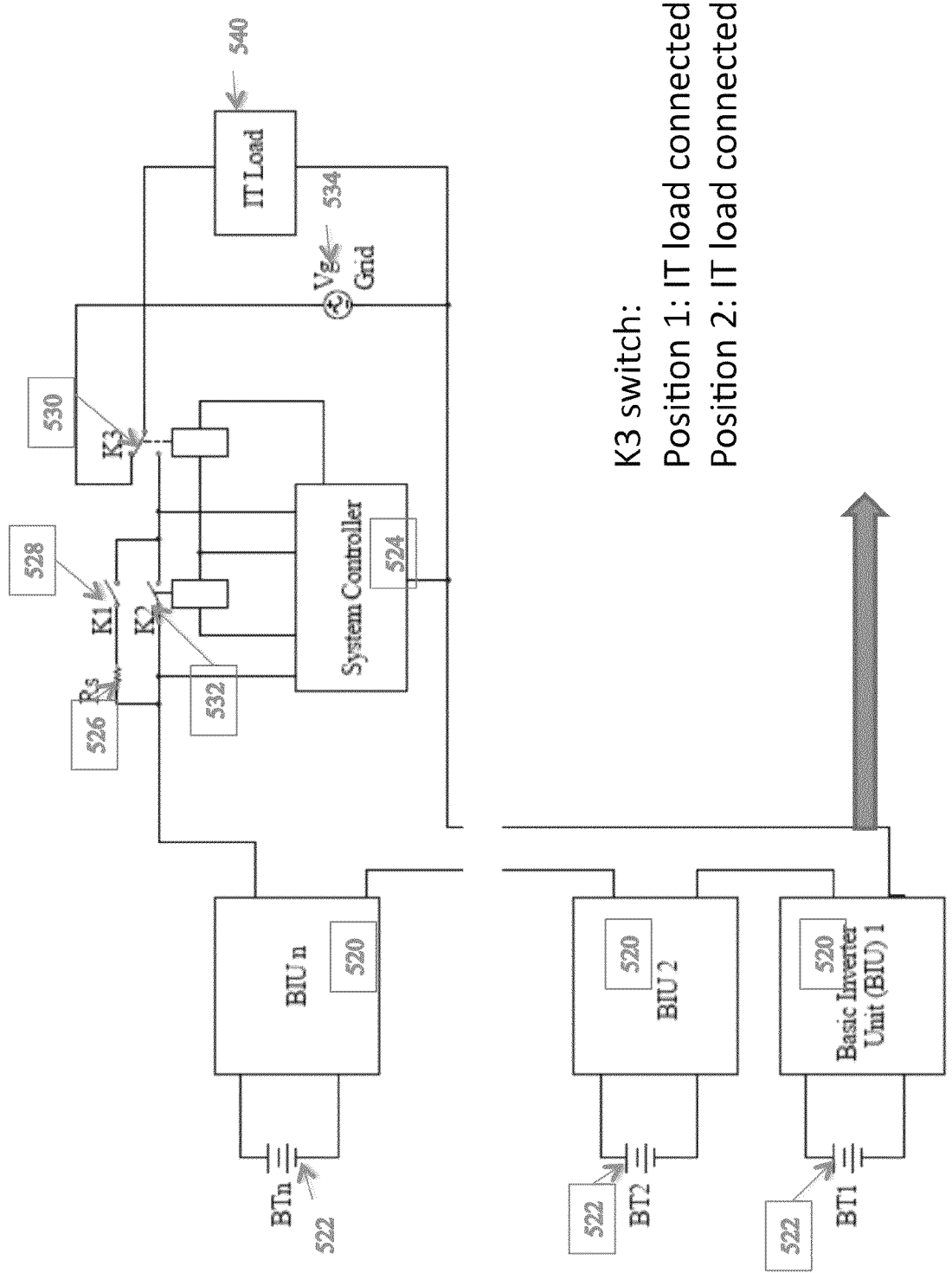
FIG. 2 shows an exemplary power control system for data center applications.
Figure 3:
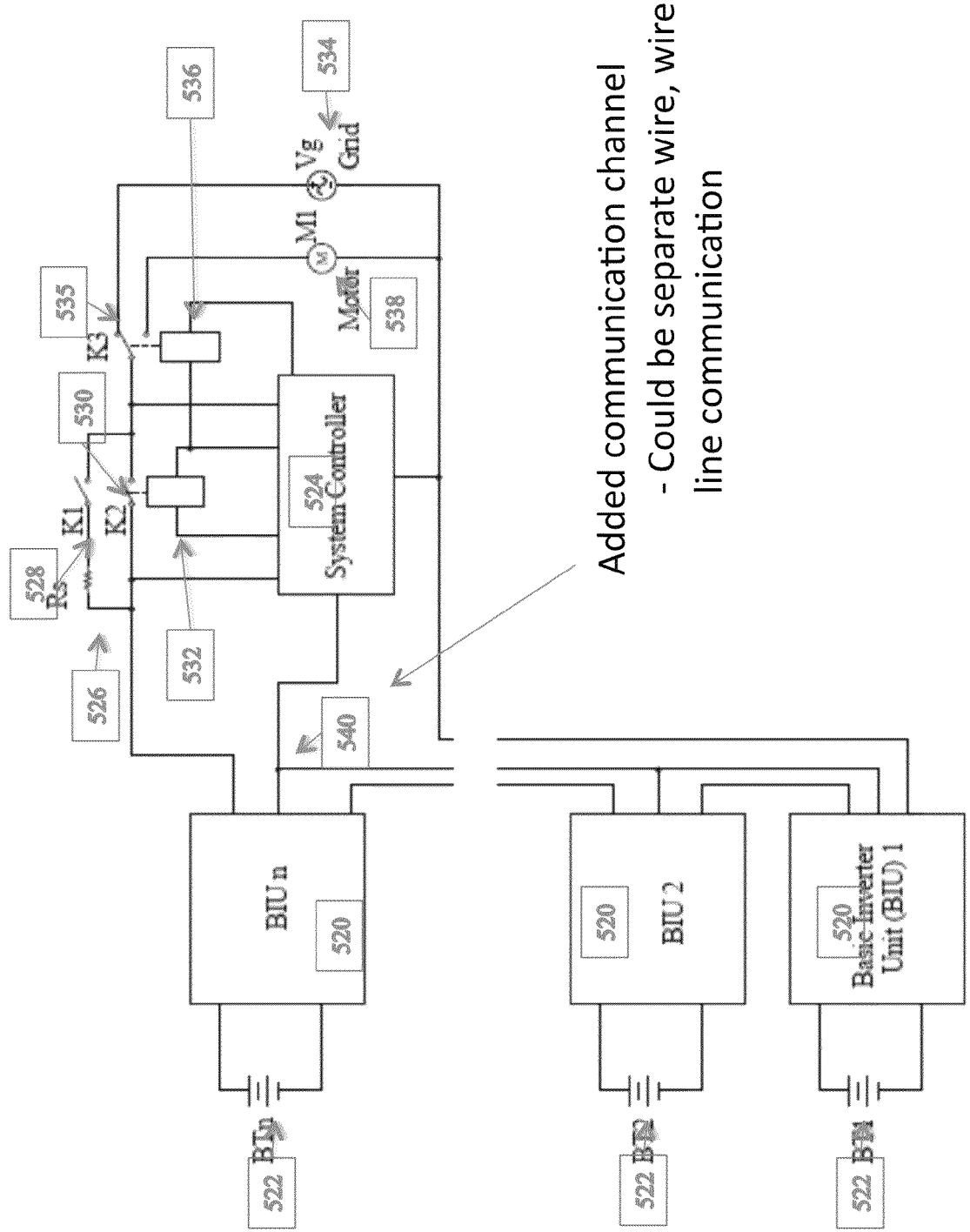
FIG. 3 shows an exemplary power control system for electric vehicle applications.

The unique topology, control and processing in the system enables usage in applications such as, but not limited to, grid storage (FIG. 1), data center (FIG. 2), and electric vehicles (FIG. 3). All three applications have fairly similar needs as far as charging of standard battery cells and discharging those same cells. In these cases, using several small battery cells aggregates the power. In some cases, manufacturers and system designers use thousands in a single cluster to make up larger energy storage capacity. The benefits of applying this unique inversion/conversion technology on a per cell basis are high reliability, high efficiency, low cost, low weight, small size and bi-directional advantages. In addition, the bi-directional and per cell charge balanced inversion and conversion, results in battery life extension, ancillary service offerings and reduction in fire hazard. With inversion and charge/discharge occurring on the battery cell level, AC battery cells and packs are a reality, which opens up a vast value-add in mobile transportation and storage. In all three example use cases, grid storage, data center and electric vehicles, it is the invention in this filing that empowers all of the benefits. The technology, fundamentally, relies on low voltage inversion from DC to AC and rectification from AC to DC, then stacking the voltage in series using the novel system control to yield a final electrical output or input which is superior to all other inversion solutions in most measureable characteristic.

Figure 1:
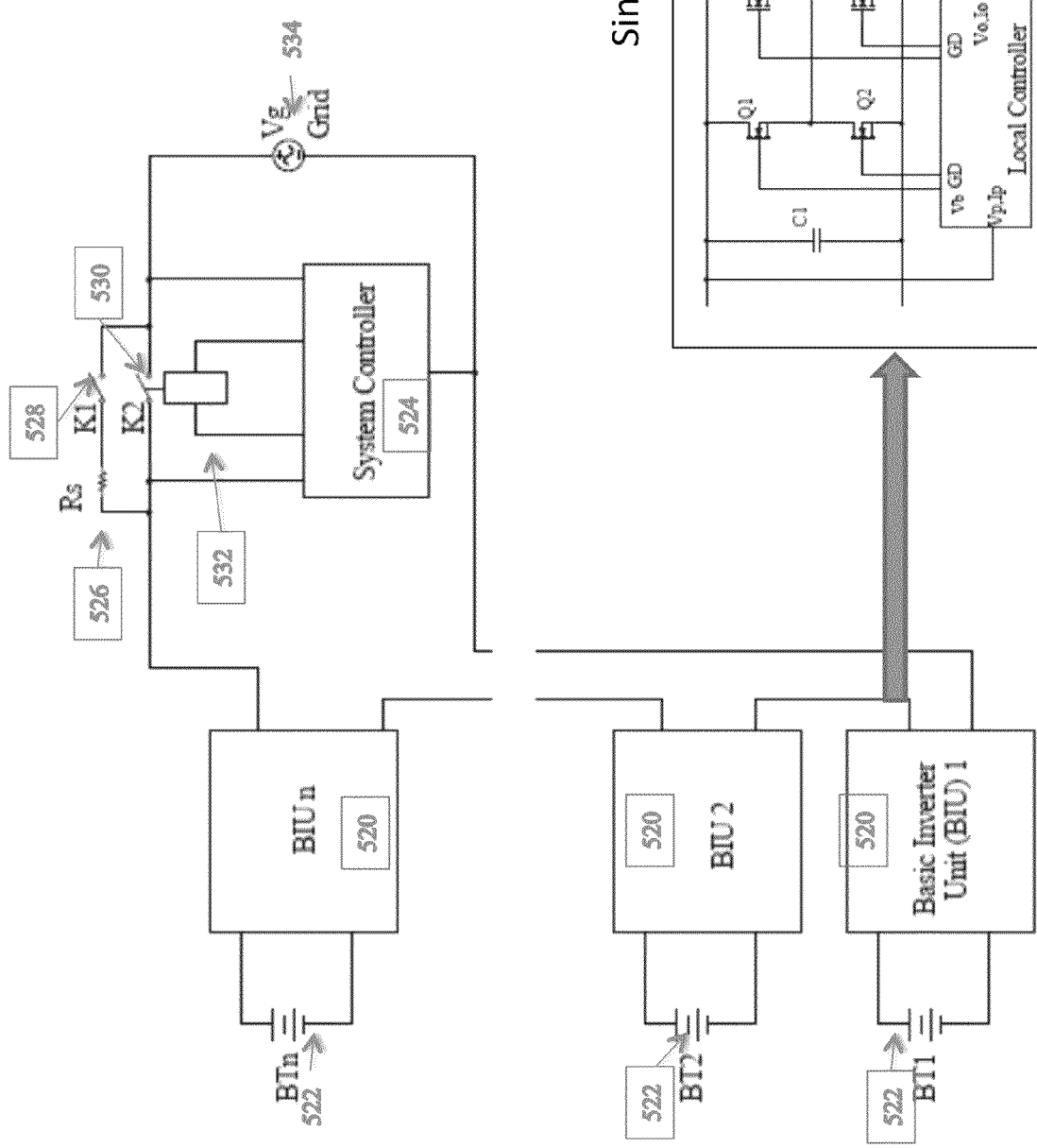
FIG. 1 shows an exemplary power control system for grid storage applications.

Turning now to FIG. 1, an exemplary power control system for grid storage applications is shown. FIG. 1 has a plurality of energy storage devices (such as batteries, among others) 522 providing power to basic inversion units 520. The basic inversion unit can be comprised of a local controller and full bridge inverter with an LC output filter and in one embodiment a DC/DC converter circuit if a different DC voltage bus is required to support the system design. This DC/DC converter can be a boost (to increase the DC bus voltage from the DC source voltage) or buck (to decrease the voltage from the DC bus to the DC source voltage) The basic inversion unit can also be comprised of a local controller and full bridge inverter with an LC output filter and in one embodiment a bidirectional isolated DC/DC converter providing galvanic isolation between DC source and AC source.

The basic inversion units 520 are connected in series, with the output of each basic inversion unit 520 controlled by a local controller. The output of the series connected basic inversion units 520 is initially connected to a resistor 526 in series with switch K1 528 and the grid 534. This signal is used by BIUs to determine and lock to the grid frequency. Once the BIUs are synchronized and started the switch K2 530 will close and connect the stacked BIUs to the grid 534. Switches 528 and 530 could either be solid state switches or relays. Switches 528-530 are controlled by a system controller to provide system soft start (no overcurrent). During normal operation the system controller can update the amount of power produced by particular BIUs to provide DC source balancing (such as battery) if necessary. The system can handle a variable number of series connected basic inversion units, where the minimum and maximum number of basic inversion units per system is determined by the aggregate grid voltage across all the series connected full bridge inverters and the maximum and minimum AC output voltage rating of each basic inversion unit. Each basic inversion unit can operate as voltage source in order to realize effective basic inversion unit stacking. The system controller communicates with the basic inversion units over a communication channel. The communication channel can be wired such as the power-line communication channel or can be wireless such as Zigbee transceivers, or can use separate wire among others. The system controller also implements algorithms detecting abnormal grid conditions and methods of shutting down and disconnecting the stacked basic inversion unit system from the grid by controlling switches K1 and K2.

In another embodiment, the system controller can configure one basic inversion unit as a current source, and the remaining basic inversion units can be used as voltage sources.

Three separate series connected groups of basic inversion units can be configured as a 3-phase inversion system in one embodiment.

FIG. 2 shows an exemplary power control system for data center applications. In this embodiment, the system acts as an uninterruptible power supply (UPS) system. In case of power grid failure switch K3 530 will disconnect the load 540 from the power grid and connect it to the UPS system. This function could be performed by the system controller 524. In the case where the power grid fails, the system controller will start the UPS system by closing K1, starting BIUs without current overshoot. Similar to FIG. 1, FIG. 2 has a plurality of energy storage devices (such as batteries, among others) 522 providing DC power to the basic inversion units 520. The basic inversion units 520 are connected in series, with the output of each basic inversion unit 520 controlled by a local controller. The output of the series connected basic inversion units 520 is also connected to a resistor 526 in series with optional switch K1 528. Optional switch K1 provides a path with limited current to pre-charge capacitors in the BIUs. Once the BIUs are started, the system controller will connect switch K2 532. Switch 530 provides connection to the grid 534 or an information technology load 540. In one position, switch 530 connects the IT load 540 to the grid 534 and in a second position switch 530 connects the load 540 to the UPS. Switches 528-532 could either be solid state switches or relays. Switches 528-532 are controlled by the system controller. The system can handle a variable number of series connected basic inversion units, where the minimum and maximum number of basic inversion units per system is determined by the aggregate grid voltage across all the series connected full bridge inverters and the maximum and minimum AC output voltage rating of each basic inversion unit. One BIU is configured as current source. Other BIUs will use this current to lock their frequency. Other basic inversion units operate as voltage sources in order to realize effective basic inversion unit stacking.

In another embodiment K1 switch can be connected directly to IT load to allow UPS to operate in idling mode. Once the grid fails the system controller needs to open K3 and close K2. Since this transitions can happen very fast will be no interruption in power to the IT load.

FIG. 3 is a corresponding diagram for a stacked inverter in an electric vehicle drive application. Similar to FIG. 1, FIG. 2 has a plurality of energy storage devices (such as batteries, among others) 522 providing power to basic inversion units 520. In normal operation switch K3 535 will connect the motor load to bi-directional converter system. To recharge batteries switch K3 535 will be connected to grid position or regenerative braking source and charge the batteries. This function could be performed by the system controller 524. In charge mode, switch K1 provides a path with limited current to pre-charge capacitors in the BIUs. Once the BIUs are started, the system controller will connect switch K2 530. Switch 530 is controlled by solenoid 532. The outputs of switches 528 or 530 are provided to switch 535 controlled by solenoid 536. In one position, switch 535 connects to the grid 534 and in a second position switch 535 connects to motor 538. The switches could either be solid state switches or relays and controlled by the system controller. A communication channel 540 is provided between the system controller 524 and the basic inversion units 520. The communication channel 540 can be wired, wireless, or over the power-line, among others.

Figure 4:
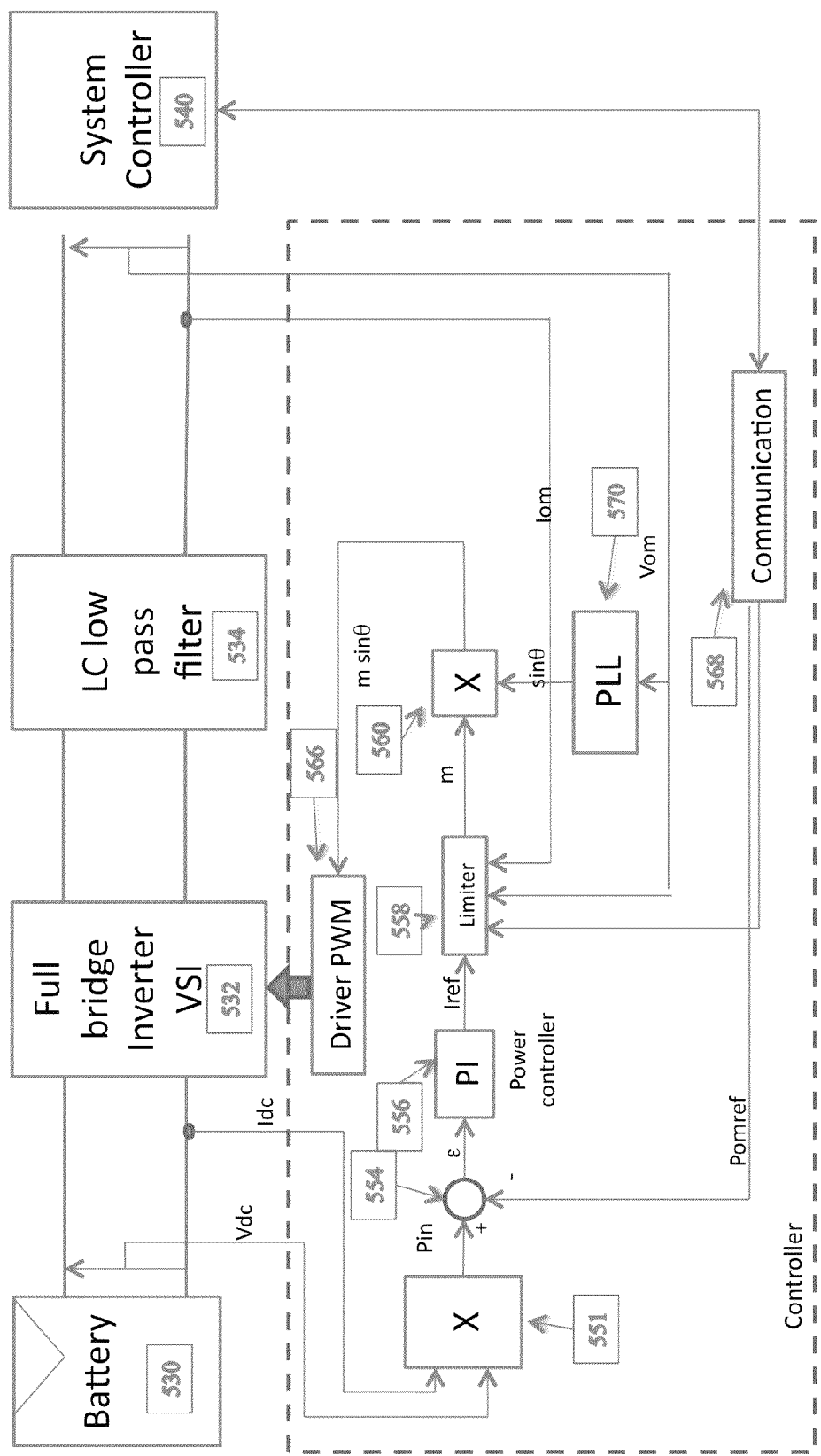
FIG. 4 shows an exemplary power control system for on-grid control discharge applications.

FIG. 4 shows an exemplary power control system for on-grid discharge applications. An energy storage device (such as a battery) 530 provides direct current (DC) output to a full bridge inverter 532. The output of the full bridge inverter 532 is provided to a low pass filer 534 which can be an inductor-capacitor (LC) type filter in one embodiment. The output of the filter 534 is provided to an AC power grid or AC power bus. The output of the filter 534 is monitored by the local controller 550. The system controller 540 monitors output voltage and current of a phase with the stacked basic inversion units. The system controller sends commands to a communication module 568 to set parameters of a limiter 558 to adjust the voltage and current generated by the inverter 532.

The voltage and current from the energy storage device 530 is monitored by a multiplier 551 whose output is received by an adder or summer 554 that drives a power controller 556, which can be a proportional integral controller in one embodiment. A reference current value is the output of the power controller. The controller 556 output is connected to the limiter 558 to generate an output m, modulation index. A multiplier 560 receives the output of the limiter 558 and a phase lock loop (PLL) 570 to generate an output m sinΘ. The limiter 558 and PLL 570 monitor the grid output as supplied through the low pass filter 534. The output of the multiplier 560 is supplied to a driver 566 such as a pulse width modulation (PWM) driver that drives the full bridge inverter 532.

Figure 5:
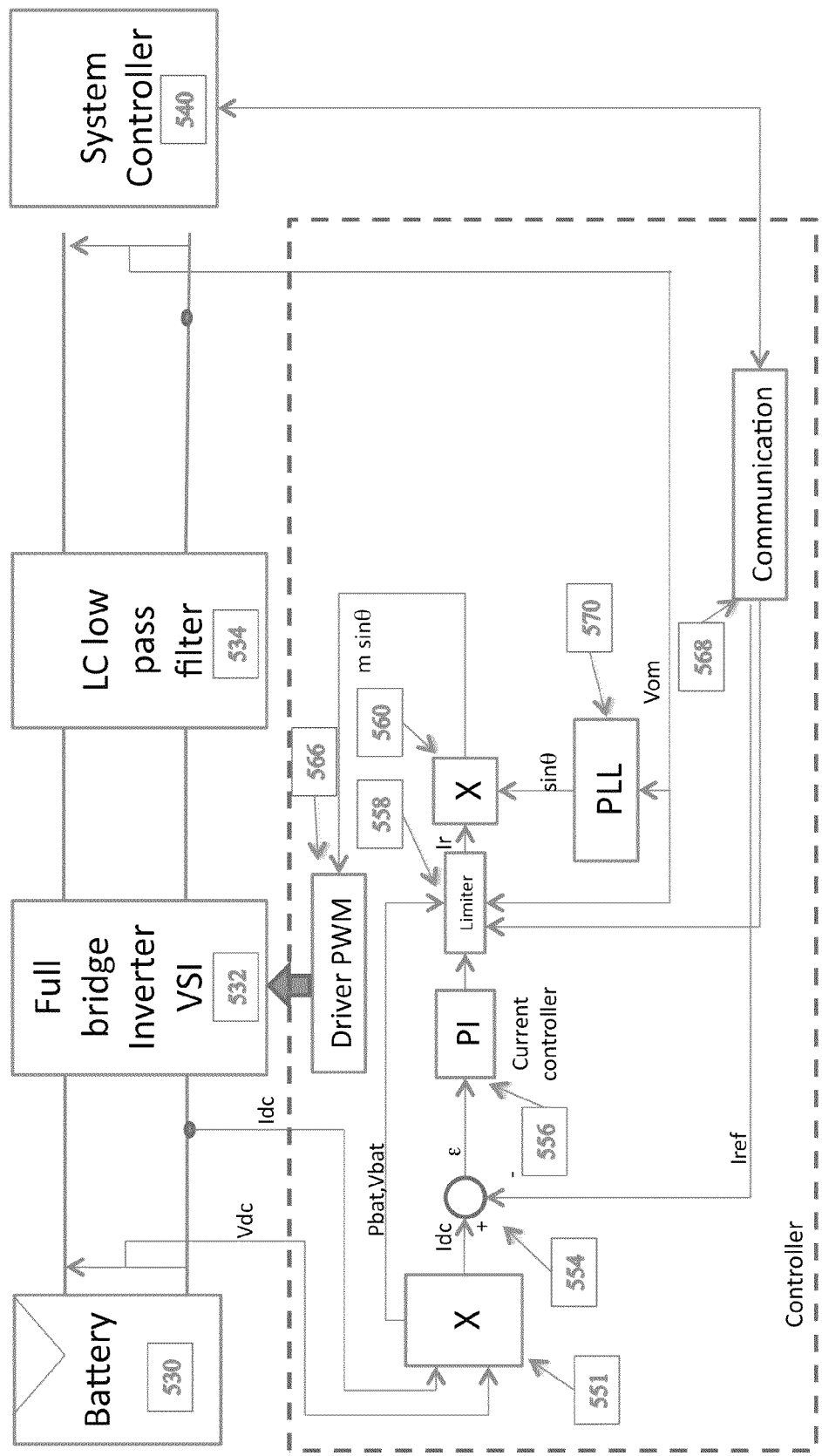
FIG. 5 shows an exemplary power control system for on-grid control charge applications.

FIG. 5 shows an exemplary power control system for on-grid control charge applications. This system is similar to the system of FIG. 4, with the addition of a battery power and voltage signal from the multiplier 551 to the limiter 558. In this mode the energy has been pulled from the grid to charge the battery.

Figure 6:
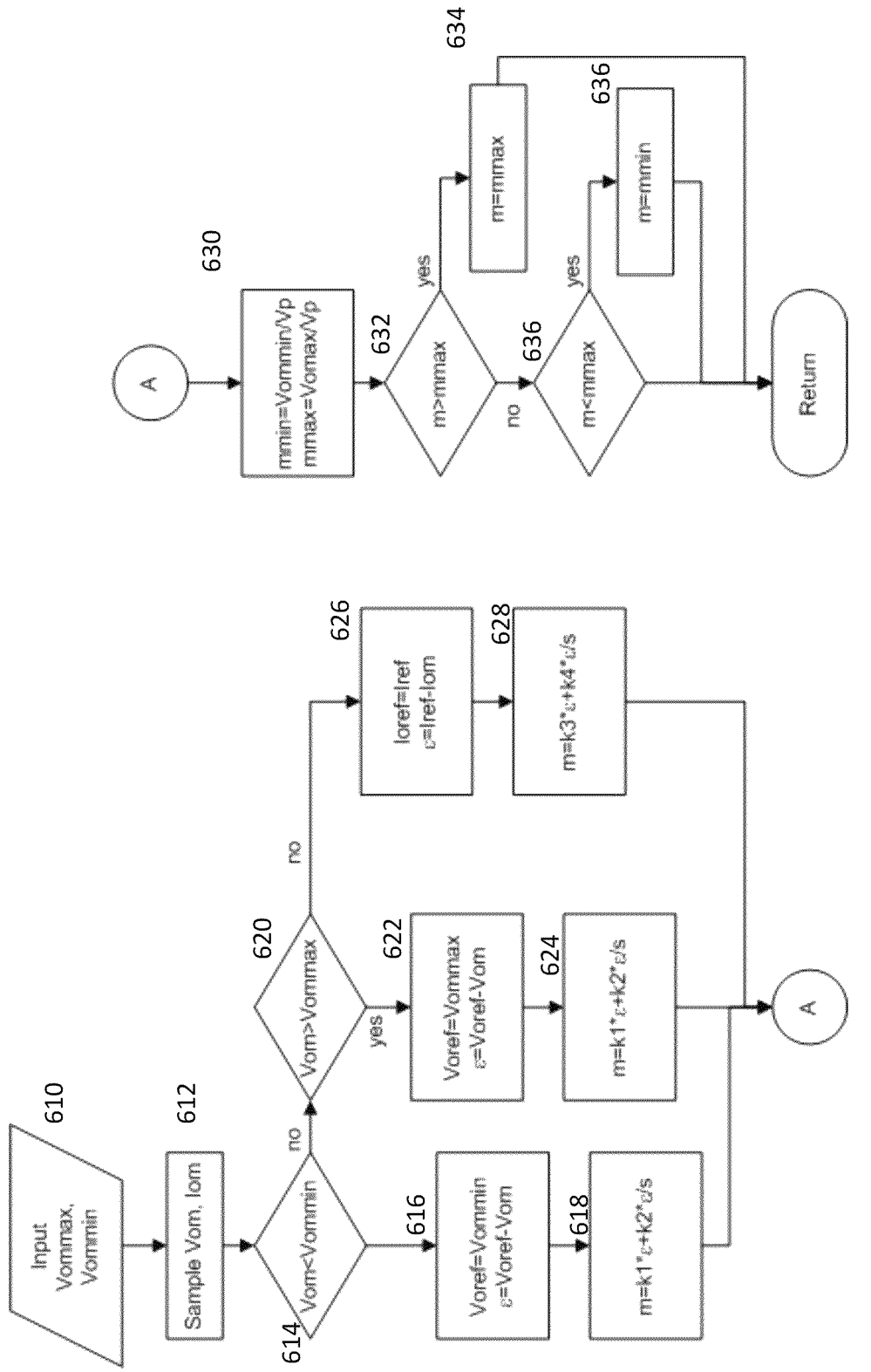
FIG. 6 shows an exemplary process by a local controller for a discharge mode.

FIG. 6 shows an exemplary process by a local controller for a discharge mode. In FIG. 6, the maximum and minimum voltage values are received from system controller (610). Next, the system samples inverter output voltage Vom and current Iom (612). Next, the process determines if Vom is less than minimum voltage Vommin, set by system controller, in 614. If the output voltage reference Voref=Vommin, then a voltage controller loop is run. Error signal, $\epsilon$, is set as Voref−Vom (616) and then modulation index, m, is calculated to be $k1*\epsilon+k2*\epsilon/s$ (618).

From 614, if Vom is greater than or equal to Vommin, the process determines if Vom>Vommax (620). If yes, reference output voltage Voref is set to Vommax and $\epsilon$ is set to Voref−Vom (622) and voltage control limiting loop is running. The process then sets m as $k1*\epsilon+k2*\epsilon/s$ (624). If no, the regular current loop is run having Ioref set to Iref and ϵ is set as Iref−Iom (626). Next, m is set to be k3*ϵk4*ϵ/s (628).

From operations 618, 624, or 628, the process proceeds to check acceptable range for modulation index m. Limits for m are set to mmin to be Vommin/Vp and mmax to be Vomax/Vp (630). Next, the process tests if m>mmax (632). If so, the process sets m=mmax (634). If not, the process tests if m<mmax (636) and if so m is set to mmin (636).

Figure 7:
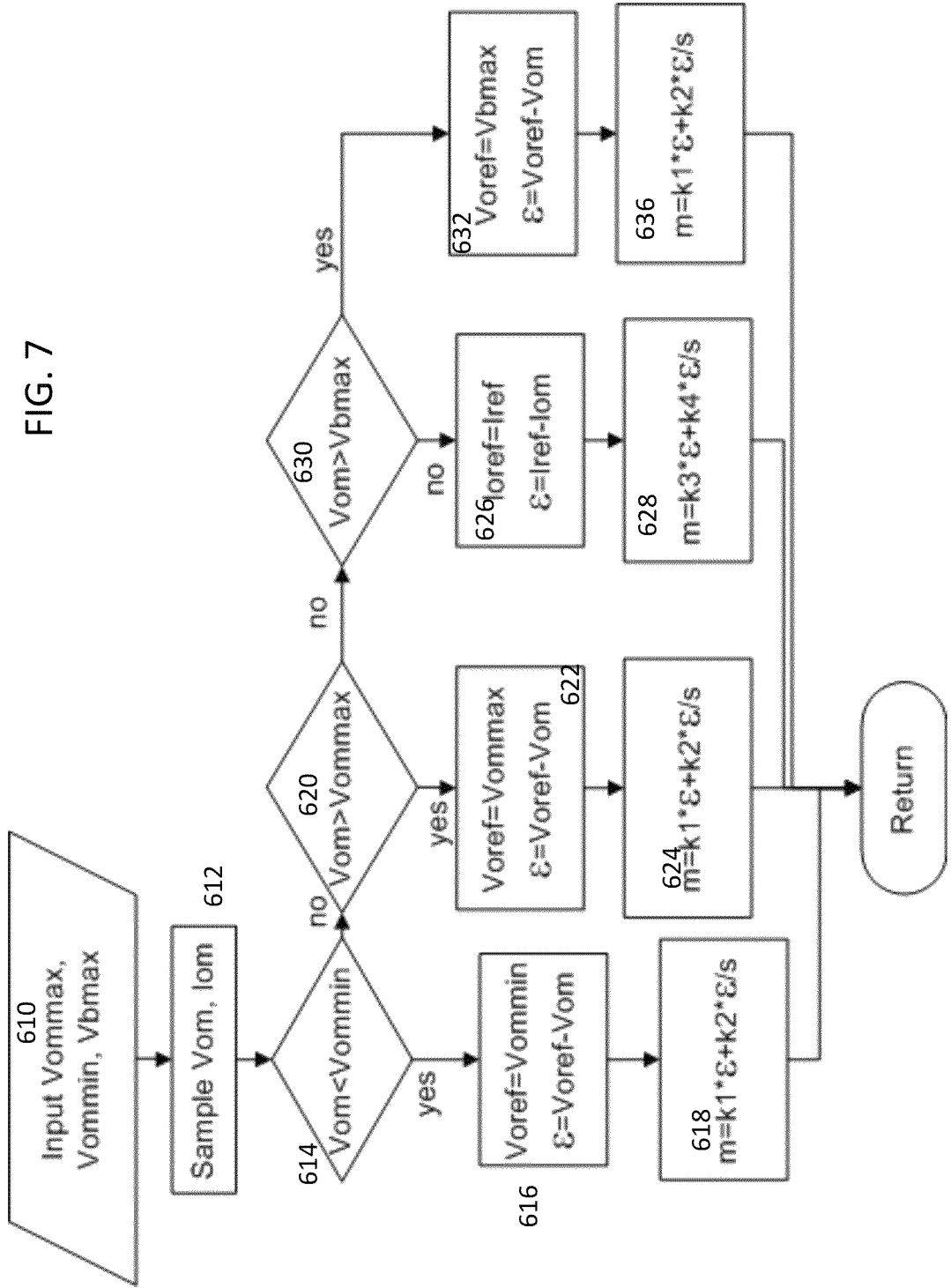
FIG. 7 shows an exemplary process by the local controller for a charge mode.

FIG. 7 shows an exemplary process by the local controller for a charge mode. The maximum and minimum voltage values are received from system controller (610). Next, the system samples inverter output voltage Vom and current Iom (612). Next, the process determines if Vom is less than Vommin in 614. If the output voltage reference Voref=Vommin, then a voltage controller loop is run. Error signal, ϵ is set as Voref−Vom (616) and then modulation index, m, is calculated to be k1*ϵ+k2*ϵ/s (618).

From 614, if Vom is greater than or equal to Vommin, the process determines if Vom>Vommax (620). If yes, Voref is set to Vommax and ϵ is set to Voref−Vom (622) and voltage control limiting loop is run. The process then sets m as k1*ϵ+k2*ϵ/s (624). From 620, if no, the system checks if Vom>Vbmax (630) and if not, the regular current loop is run having Ioref set to Iref and ϵ is set as Iref−Iom (626). Next, m is set to be k3*ϵ+k4*ϵ/s (628). From 630, if Vom>Vbmax, Voref is set to Vbmax and ϵ is set to Voref−Vom (632) and m is set to k1*ϵ+k2*ϵ/s (636).

Figure 8:
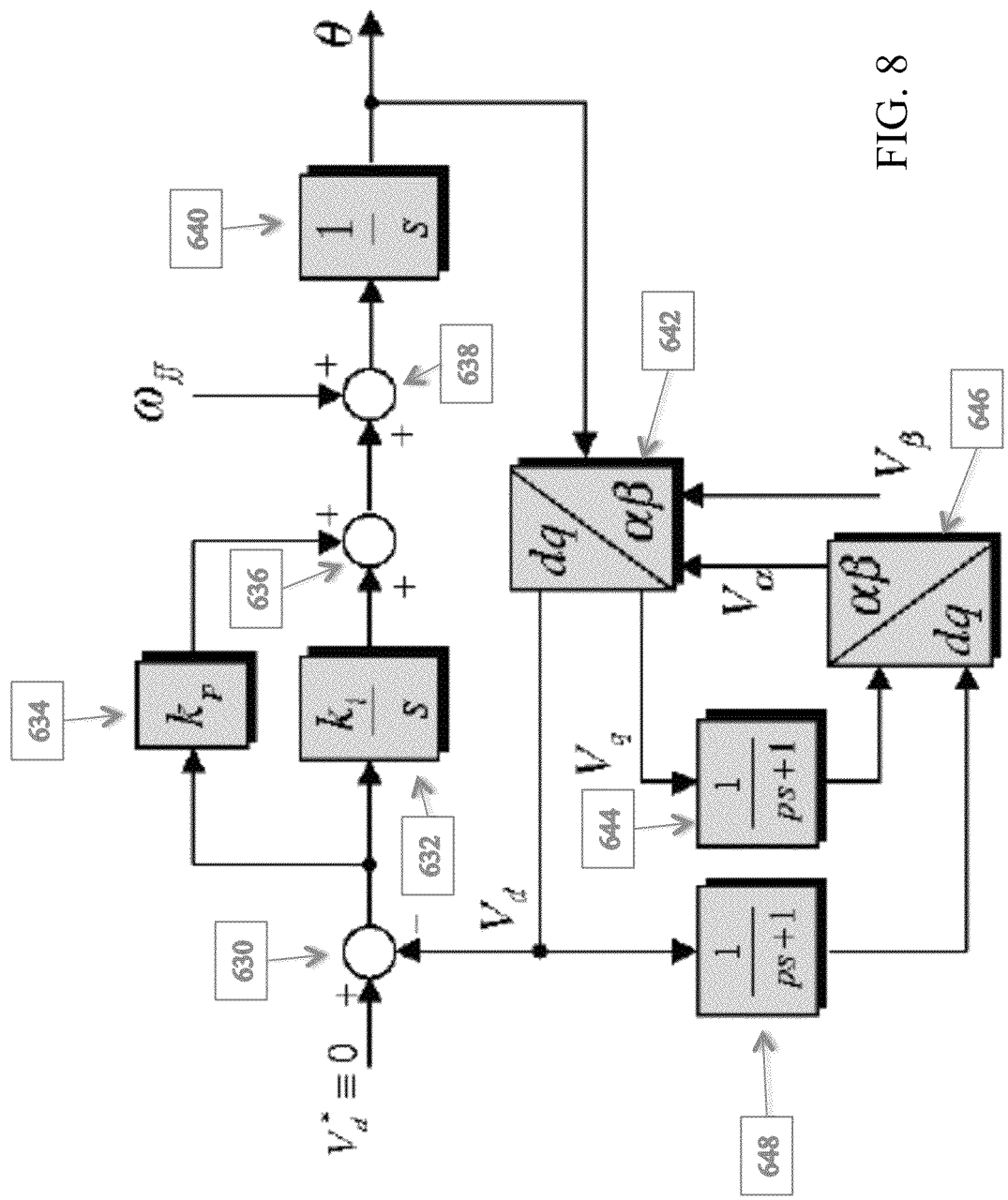
FIG. 8 shows an exemplary phase-locked-loop used by the local controller.

FIG. 8 shows an exemplary phase-locked-loop used by the local controller. A single-phase voltage (Vβ) and an internally generated signal (Vα) are used as inputs to a Park transformation block (αβ-dq). The d-axis output of the Park transformation is used in a control loop to obtain phase and frequency information of the input signal. Vα is obtained through the use of an inverse Park transformation, where the inputs are the d and q-axis outputs of the Park transformation (dq-αβ) fed through first-order pole blocks. The poles are used to introduce an energy storage element in the internal feedback loops. I another embodiment the PLL algoritham can be run in system controller and syncronisations signal can be provided to local controle by various communication means.

Figure 9:
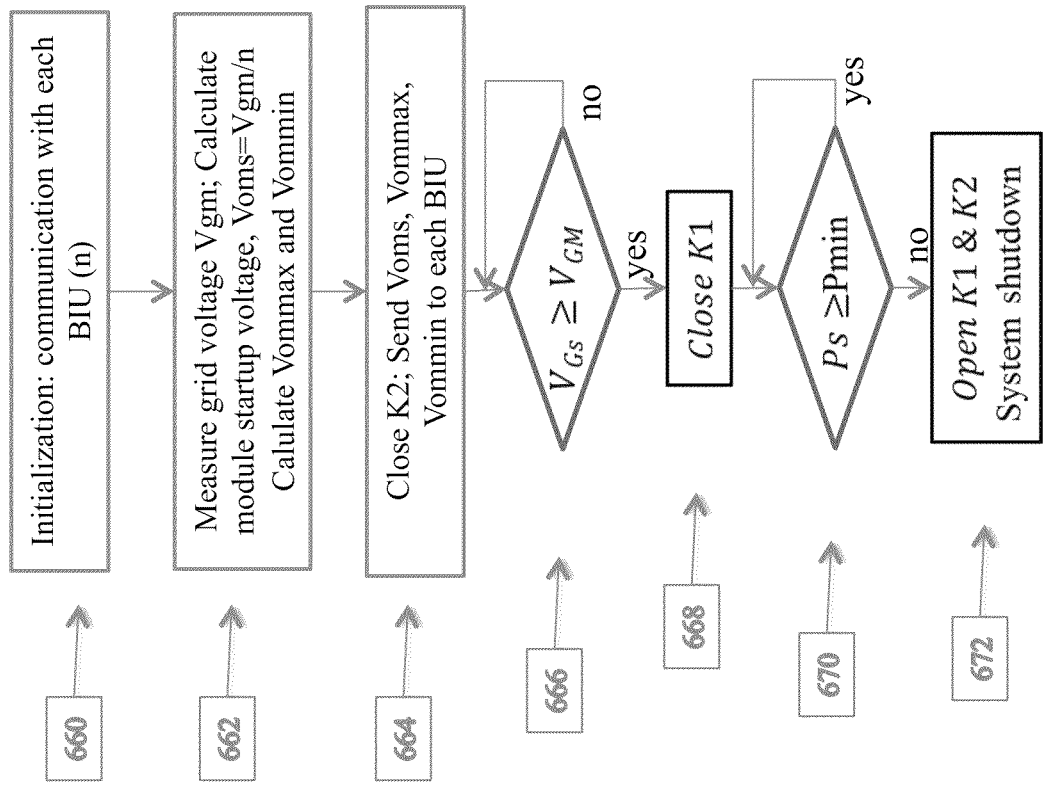
FIG. 9 shows an exemplary process by a system controller for a discharge mode.

FIG. 9 shows an exemplary process by a system controller for a discharge mode. The process first initializes communication with each of n series connected basic inversion units (660). The process then measures a grid voltage Vgm and determines a basic inversion unit startup voltage Voms=Vgm/n, and operating range for the basic inversion units (based on grid voltage and number of basic inversion units), Vommax and Vommin, (662). Next, the process closes a relay or a switch K1 and sends the determined Voms, Vommax, Vommin to each basic inversion unit (664).

Next, the process determines if the stacked inverter phase voltage, Vgs, is greater than or equal to grid voltage, Vgm (666) and if not, the process waits until the desired voltage is reached. Once this is achieved, the process closes relay or switch K2 (668). This is normal operating mode where power from n BIUs is being delivered to the AC grid. Next, the process monitors delivered power to the grid, Ps If the power Ps is greater than or equal to the minimum operating power Pmin (670), the process loops back to 670 to continue providing power. If not, the process opens relays K1 and K2 and performs system shutdown (672).

Figure 10:
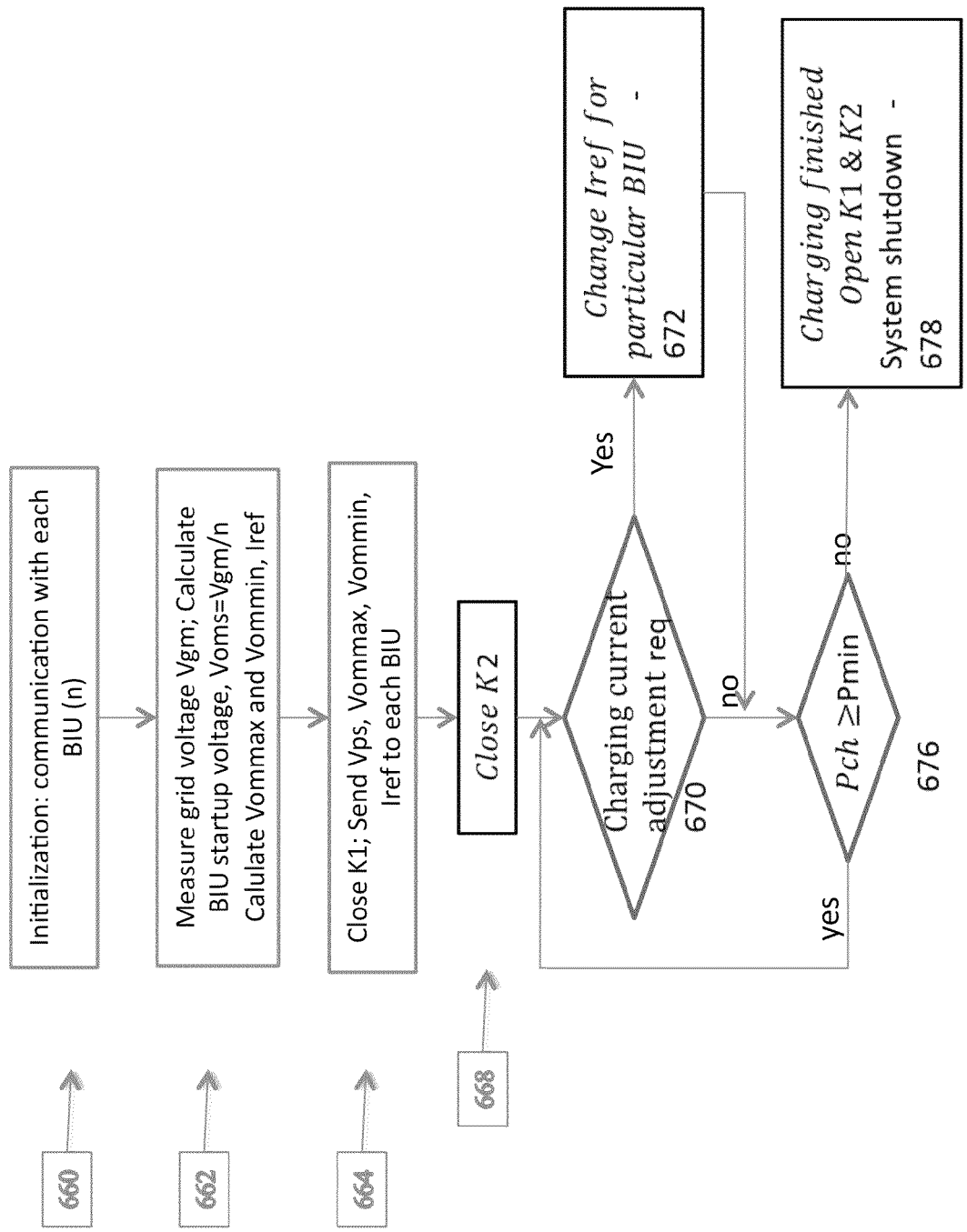
FIG. 10 shows an exemplary process by the system controller for a battery charge mode.

FIG. 10 shows an exemplary process by the system controller for a battery charge mode. The process first initializes communication with each of n series connected basic inversion units (660). The process then measures a grid voltage Vgm and determines a basic inversion unit startup voltage Voms=Vgm/n, and operating range for the basic inversion units (based on grid voltage and number of basic inversion units), Vommax and Vommin, (662). Next, the process closes a relay or a switch K1 and sends the determined Voms, Vommax, Vommin to each basic inversion unit (664).

Once this is achieved, the process closes relay or switch K2 (669). From 669, the process checks if charging current needs adjustment (671) and if so, changes the reference current Iref for a particular BIU (672). From 671 or 672, the process checks if charging power Pch is greater or equal to Pmin (677) and if not, opens K1 and K2 and performs system shutdown (678) as charging is done.

Figure 11:
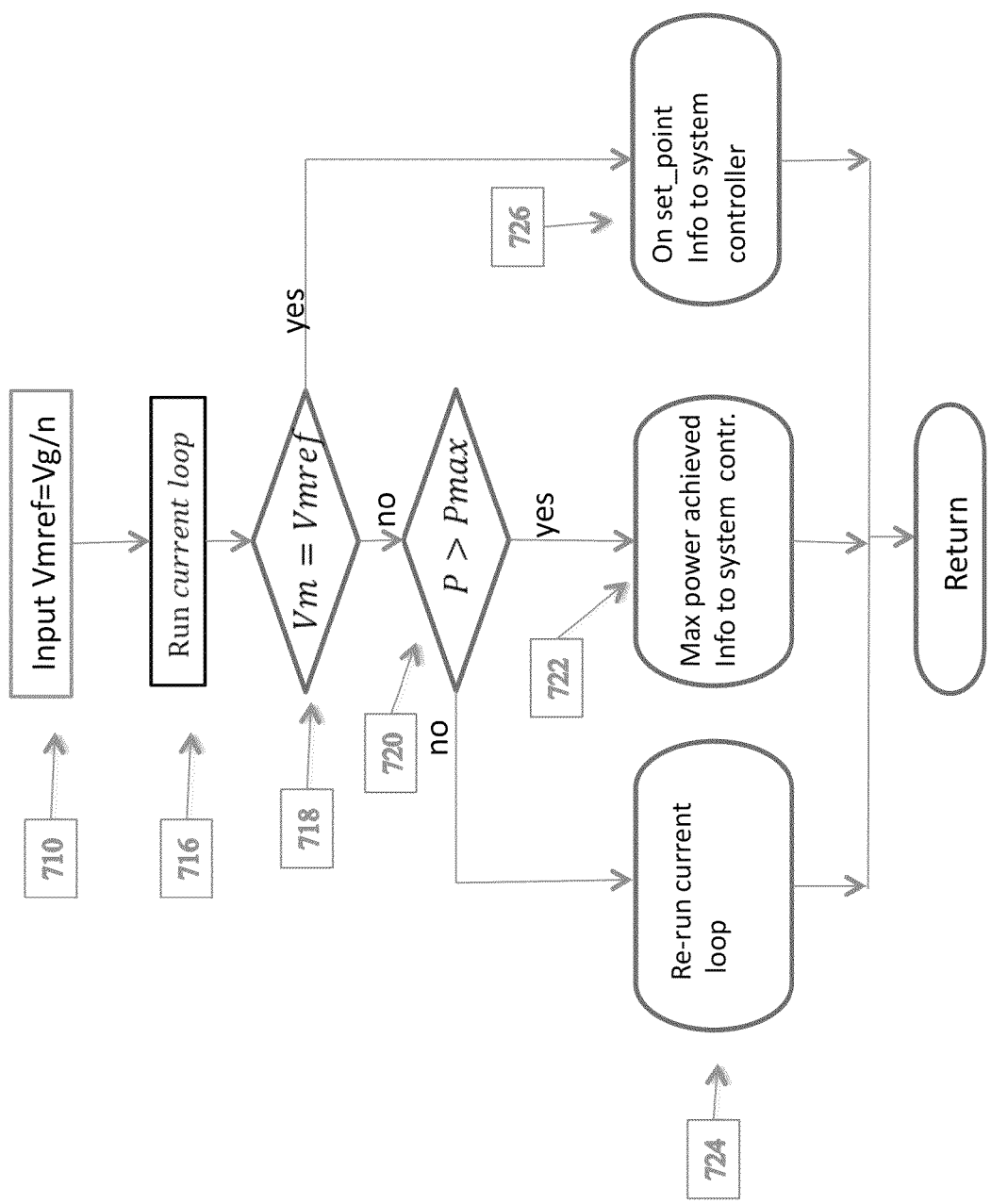
FIG. 11 shows an exemplary process by a local controller of a master BIU for off-grid control.

FIG. 11 shows an exemplary process by a main or system controller for off-grid control. The system sets an input reference voltage Vmref as Vg/n, where n is the number of series connected basic inversion units (710). Next, the process runs a current loop (716) and generates modulation signal based on the loop output and frequency information received from system controller. The system then determines if Vm is equal to Vmref (718). If not, the system checks if required power is higher than the system can provide (720). If maximum power is not achieved, the system re-runs the current loop (724). Alternatively, if maximum power is achieved, the system notifies the system controller that maximum power has been achieved (722). In 718, if Vm=Vmref, the process sends on set point information to the system controller (726).

Figure 12:
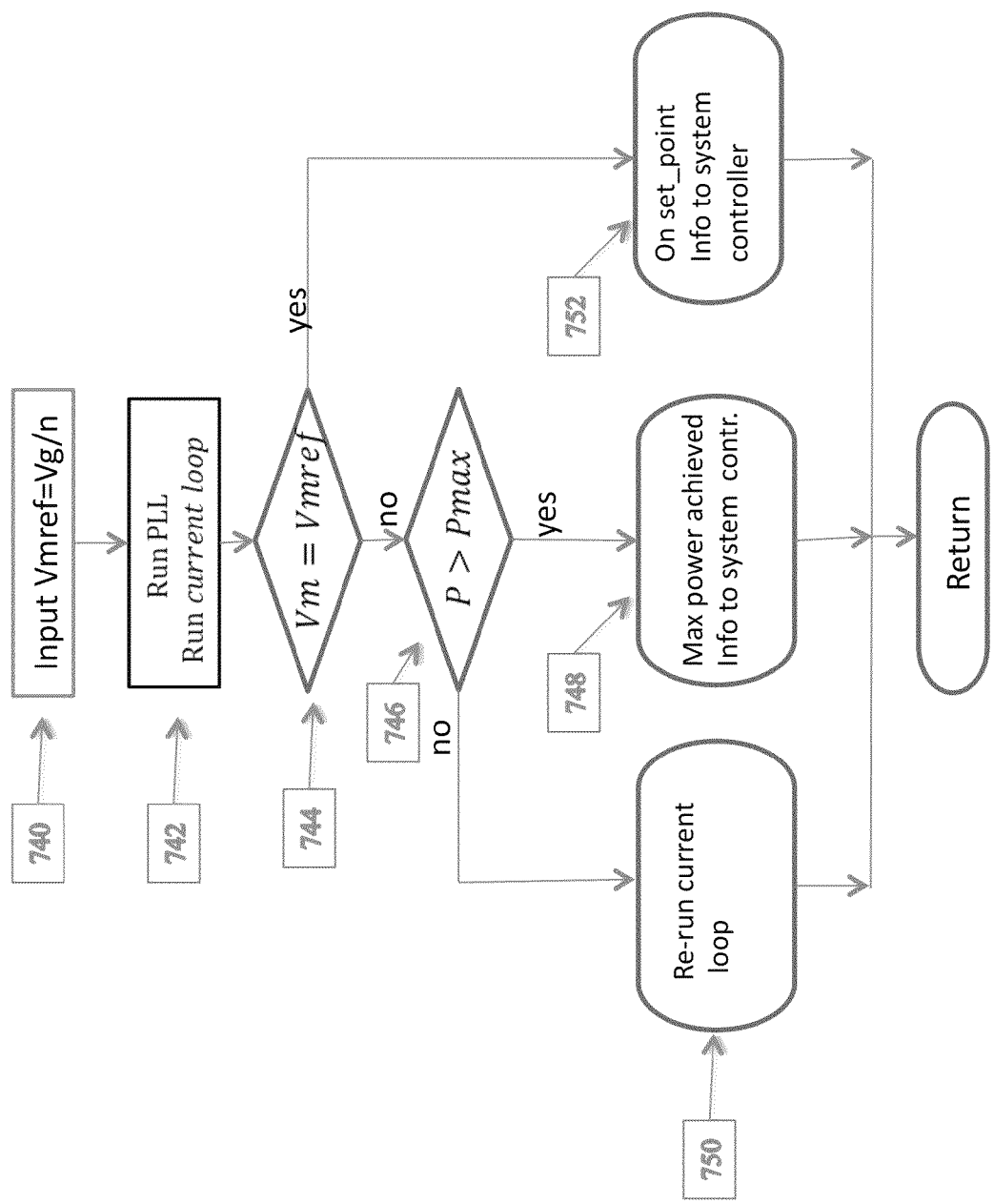
FIG. 12 shows an exemplary process by a local controller of a slave BIU for off-grid control.

FIG. 12 shows an exemplary process by a local controller of BIU for off-grid control. The system sets an input reference voltage Vmref as Vg/n, where n is the number of series connected basic inversion units (740). Next, the process runs a PLL, locks to the AC frequency, runs a current loop (742) and generates modulation signal based on PLL output and the loop output. The system then determines if Vm is equal to Vmref (744). If not, the system checks if required power is higher than system can provide (746). If maximum power is not achieved, the system re-runs the current loop (750)). Alternatively, if maximum power is achieved, the system notifies the system controller that maximum power has been achieved (748). In 744, if Vm=Vmref, the process sends on set point information to the system controller (752).

Figure 13:
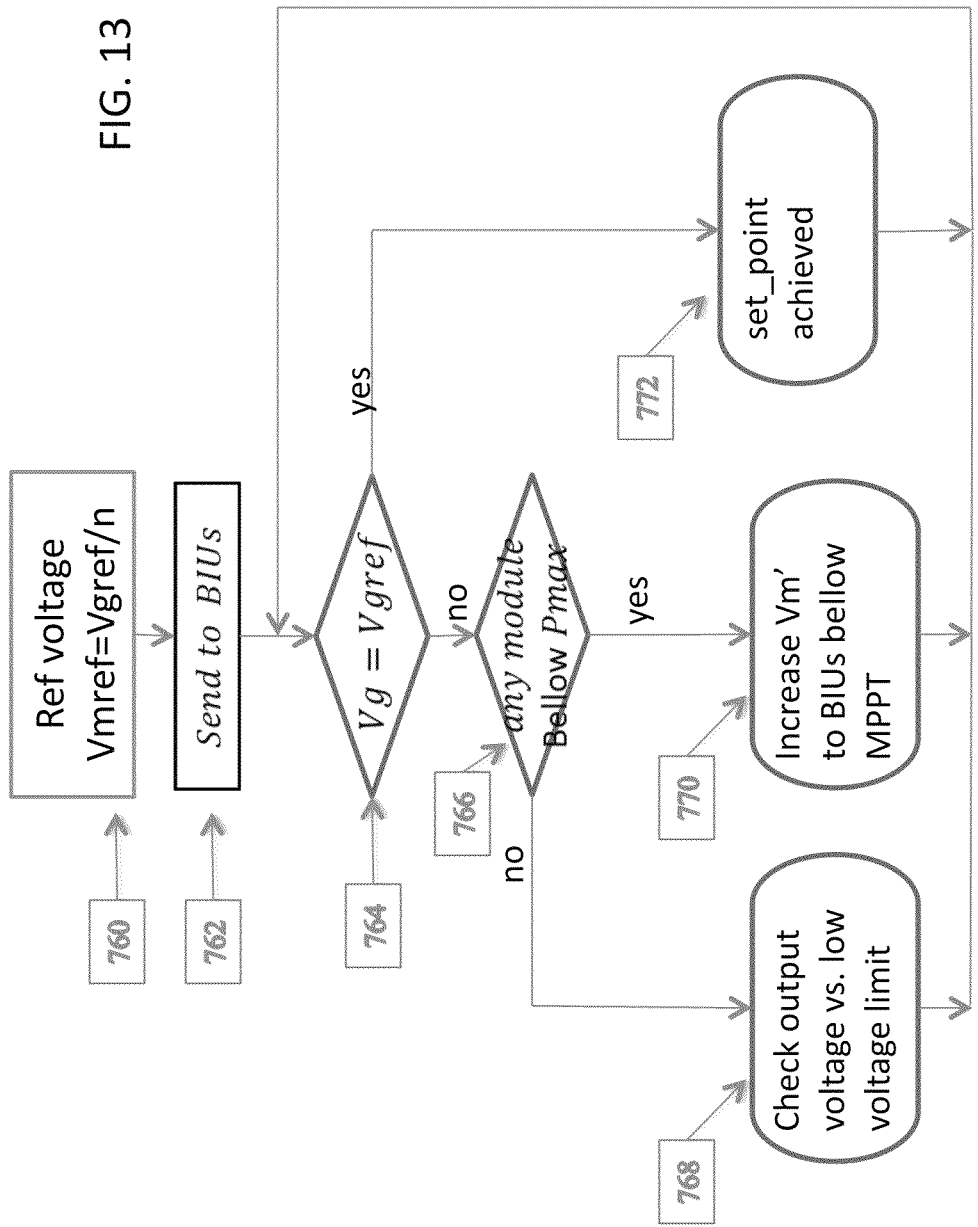
FIG. 13 shows an exemplary process by a system controller for off-grid control.

FIG. 13 shows an exemplary process by a system controller for off-grid control. The system sets an input reference voltage Vmref as Vgref/n, where n is the number of series connected basic inversion units (760), Vgref is grid reference voltage and defines an output frequency. Next, the process sends the reference voltage information and output frequency to the basic inversion units (762). Next, the process determines if Vg is equal to Vgref (764). If not, the system checks each basic inversion unit to see if the maximum power is achieved (766). If no basic inversion unit is below maximum power, the process checks the output voltage against a low voltage limit (768). Alternatively, for basic inversion units whose output is below the maximum available power, the process increases the target voltage Vm' to these basic inversion units (770). From 764, if Vg is equal to Vgref, the process notifies the system that the set point voltage has been achieved (772).

In one embodiment for off-grid power control application, the system controller defines output frequency and operating voltage for each basic inversion unit. Next, the system controller assigns a master function to one basic inversion unit, and the system controller assigns slave function to all other stacked basic inversion units. The master starts first and provides AC power serving as a reference frequency to slave basic inversion units. Each slave locks to the reference frequency using a PLL and start generating its own AC power. The system controller monitors power production and adjusts basic inversion unit operation as necessary.

In one embodiment, the basic inversion units are series connected using a single conductor cable and connectors. The use of only single conductor cables and connectors reduces material costs. Each basic inversion unit provides an output AC power to a series connected AC bus. The AC bus terminates into a system controller. The system controller generally connects together the outputs from all the basic inversion units to form a single AC feed.

In one embodiment, the system includes aBIUs with two standard cables and connectors. The use of only two single conductor cables/connectors reduces material and labor costs in installing the system. Each basic inversion unit provides an output AC power to a series connected AC bus. The AC bus terminates into a system controller box. The system controller generally connects together the outputs from all the basic inversion units to form a single AC feed to an electric panel.

In one implementation, a bank of batteries can supply power to a plurality of series connected basic inversion units through the system controller to the power grid and, in some applications, to appliances within a user's facility. For example, in a home, the electric panel is a well-known AC distribution hub having various circuit breakers and/or fuses to distribute electricity to various circuits within the home. The electric panel is coupled through the electric meter to the power grid. The meter determines the amount of power supplied to the grid, such that the owner of the PV panel can be compensated for supplying electricity.

The basic inversion units convert DC to AC in accordance with the control and switching signals produced by the local controller. The controller produces the control and switching signals in response to the samples of the DC and AC signals. Consequently, the basic inversion units may be optimally controlled to utilize a particular mode of operation to correspond to the present state of the DC and AC signals, i.e., to balance charge of the DC source to provide longer system operation and extend life time for dc storage elements.

Using such an AC bus and individual basic inversion units, the system is scalable and flexible to fit any user's needs. The structure and function of the basic inversion units are discussed next.

A DC energy source provides input power to the AC bridge. A decoupling capacitor filters switching ripple from the AC bridge as well as lower frequency ripple from the AC grid. The AC bridge can be a PWM controlled half bridge or full bridge inverter which output terminals are connected to a AC filter. The AC filter can be a low pass filter that filters out the high frequency PWM harmonic noise. The output circuit implements a sensing circuit for synchronization to the AC grid frequency and a disconnect relay.

In some embodiment a DC conversion stage may be required to adjust dc bus voltage for optimal performance. A boost circuit would be, for example, used to increase the operating voltage across the DC link capacitor thereby allowing for a larger peak to peak AC operating voltage across the AC input and output terminals. A larger peak to peak AC operating voltage allows for fewer single level inverters to be used to generate a required stacked phase AC output voltage. A buck circuit would be used to reduce the operating voltage across the DC link capacitor. This would enable use of lower voltage rating transistors in the AC bridge thereby increasing amount of power that one stacked phase can produce and in turn reduce system cost.

DC energy is supplied by a DC electric source, which can store energy such as a battery, generator capacitor, or a flying wheel, among others. The output of the DC electric source is provided to a DC stage, whose output is smoothed by a filter and provided to a bridge circuit. The output of the bridge circuit is provided to a filter, and the resulting output stage is connected in series to the output of other basic inversion units using suitable cables.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A multiple dc sources bi-directional energy converter, comprising: a plurality of direct current (DC) power sources; one alternating current (AC) power source; at least two or more full bridge converters, each having a primary node and a secondary node, each full bridge converter having a positive and negative node, each full bridge converter having a voltage supporting device electrically connected in a parallel relationship between said positive node and said negative node of said full bridge converter, each full bridge converter having an inductor electrically connected between the primary node and said first leg of the full bridge converter, and a direct current (DC) power source connected between said positive and negative nodes; at least one stacked alternating current (AC) phase, each stacked alternating current (AC) phase having a plurality of said full bridge converters, said one of said full bridge converter each of said full bridge converters in each stacked alternating current (AC) phase interconnected in a series relationship with said secondary node of one of said full bridge converters connected to said primary node of another full bridge converter, said series interconnection defining a first full bridge converter and a last full bridge converter, each alternating current (AC) phase having an input node at said primary node of said first full bridge converter and an output node at said secondary node of said last full bridge converter; an alternating current (AC) power source connected across said alternating current (AC) phase; a local controller coupled to each full bridge converter, said local controller controlling the firing sequence of the switching devices in said full bridge converter to generate a sinusoidal voltage waveform when operated as a voltage source inverter in one direction or generate an approximate constant direct current (DC) output when operated as a full-wave active rectifier in the opposite direction, each local controller coupled to a communication transceiver; and a system controller communicating to each local controller communication transceiver, the system controller controlling the power flow through one or more switches or relays connected in series between primary and/or secondary conductors of each stacked inverter phase and the power grid, the system level controller generating a system control signal for configuration activation, deactivation and operating mode selection of said local controller and said system controller providing on and off control signals to said switches or relays to prevent reverse power flow from the power grid across said full bridge inverter stages when the output voltage of said stacked inverter phase is or falls below the power grid voltage.

2. The bi-directional energy converter of claim 1, comprising three stacked inverter phases.

3. The bi-directional energy converter of claim 2, comprising a wye (Y) connection or a delta (Δ) connection.

4. The bi-directional energy converter of claim 1, comprising
   a two pole switch;
   a motor coupled to the first pole of the switch; and
   an AC power source coupled to the second pole of the switch.

5. The bi-directional energy converter of claim 4, comprising a controller connecting stacked output phase to AC power source to charge a DC source or to provide driving power to an electrical motor.

6. The bi-directional energy converter of claim 1, wherein each full bridge converter incorporates a switch electrically connected in parallel to its primary and secondary node, where said switch can be controlled by the local controller associated with said full bridge converter or by the system controller to short the primary and secondary nodes, allowing the remaining series connected full bridge converters to operate.

7. The bi-directional energy converter of claim 1, wherein each full bridge converter comprises a first switching pair and a second switching pair, each of said switching pairs having a plurality of switching means for controllably regulating electrical current flow.

8. The bi-directional energy converter of claim 7, comprising a capacitor attached across said primary node and said secondary node.

9. The bi-directional energy converter of claim 7, wherein said switching means comprises a gate turn-off device and an anti-parallel device connected in parallel and oppositely biased with respect to one another.

10. The bi-directional energy converter of claim 9, wherein said gate turn-off device comprises a component selected from the group consisting of: a gate turn-off thyristor, an insulated gate bipolar transistor (IGBT), a metal-oxide-semiconductor field-effect transistor (MOSFET), a metal semiconductor field effect transistor (MESFET), a junction gate field-effect transistor (JFET), a MOSFET controlled thyristor, a bipolar junction transistor (BJT), a static induction transistor, a static induction thyristor and a MOSFET turn-off thyristor.

11. The bi-directional energy converter of claim 9, wherein the antiparallel device is a diode.

12. The bi-directional energy converter of claim 1, comprising a buck or boost voltage regulation circuit between the direct current DC power source and the full bridge converter.

13. The bi-directional energy converter of claim 1, comprising a variable number of full bridge converters for configuration within a given or across different alternating current (AC) phase voltages.

14. The bi-directional energy converter of claim 1, where each stacked full bridge converter operates with different power.

15. The bi-directional energy converter of claim 1, comprising a variable number of stacked full bridge converters for each alternating current (AC) phase.

16. The bi-directional energy converter of claim 1 where dc power source can be any device that can store energy and supply energy including any battery, capacitor or flying wheel.

17. The bi-directional energy converter of claim 1, where the positive and negative nodes of each full bridge converter is connected to one or more direct current (DC) battery cells, where the local controller of each said full bridge converter regulates the battery charge or discharge based on a defined charge and discharge profile, where such profiles can be static or dynamically determined by the system controller.

18. The bi-directional energy converter of claim 4, wherein the system controller drives a motor by having a master module to generate a reference frequency and other modules lock to the reference frequency.

19. The bi-directional energy converter of claim 4, wherein the system controller controls a motor by dynamically controlling power and drive reference frequency.

20. The bi-directional energy converter of claim 8, wherein each of said switching means having a first end and a second end, said first switching pair having a plurality of switching means electrically connected at said first end at said positive node of said full bridge inverter, said second end of one of said switching means of said first switching pair electrically connected to one end of an inductor-capacitor low pass filter and second end of the inductor-capacitor low pass filter is connected to said primary node, said second end of another of said switching means of said first switching pair electrically connected to said secondary node, said second switching pair having a plurality of switching means electrically connected at said second ends at said negative node of said full bridge inverter, said first end of one of said switching means of said second switching pair electrically connected to said primary node, said first end of another of said switching means of said second switching pair electrically connected to said secondary node.

21. A method for providing energy from one or more DC sources, comprising: detecting grid AC voltage levels where a stacked phase is connected to a grid network; calculating AC start up voltage for stacked full bridges; generating a first error signal from a comparison of calculated power with a reference power and a reference DC current; rectifying and averaging output AC current and comparing said average output AC current with a reference DC current; generating a second error signal from said comparison of said average output AC current with said reference DC current level; detecting an AC line voltage having a period; generating a phase reference signal directly related to said period of said AC line voltage; limiting phase reference signal per configuration limits provided by system controller determining a modulation index; providing a reference table for said modulation index; and generating a plurality of firing reference signals for a plurality of full bridge inverters using said phase reference signal and a sum of a phase shift offset signal and an said average phase shift signal.

* * * * *